United States Patent [19]

Hutchins

[11] 4,297,114
[45] Oct. 27, 1981

[54] VACUUM CLEANER HAVING BAG CLEANING APPARATUS

[75] Inventor: Alma A. Hutchins, Pasadena, Calif.

[73] Assignee: Hutchins Manufacturing Co., Pasadena, Calif.

[21] Appl. No.: 82,595

[22] Filed: Oct. 9, 1979

Related U.S. Application Data

[63] Continuation of Ser. No. 871,819, Jan. 24, 1978, abandoned.

[51] Int. Cl.³ .............................................. B01D 46/04
[52] U.S. Cl. ...................................... 55/299; 55/305; 55/373; 55/472; 55/DIG. 3
[58] Field of Search .................................. 55/294–300, 55/304, 373, 472, DIG. 3, 288, 305

[56] References Cited

U.S. PATENT DOCUMENTS

| | | | |
|---|---|---|---|
| 983,574 | 2/1911 | Shafer | 55/299 |
| 1,757,834 | 5/1930 | Haegler | 55/304 |
| 2,534,171 | 12/1950 | Kirby | |
| 2,661,811 | 12/1953 | Kautz | 55/296 X |
| 3,032,954 | 5/1962 | Racklyeft | 55/400 X |
| 3,236,032 | 2/1966 | Yasukawa et al. | 55/299 |
| 3,276,066 | 10/1966 | Chiba | |
| 3,358,316 | 12/1967 | Okun | 55/472 X |
| 3,407,432 | 10/1968 | Finn | |
| 3,413,779 | 12/1968 | Takahashi et al. | 55/304 X |
| 3,609,946 | 10/1971 | Nakagawa et al. | 55/296 |
| 3,621,641 | 11/1971 | Takei et al. | 55/472 X |
| 3,716,968 | 2/1973 | Mischke | 55/294 |
| 3,731,465 | 5/1973 | Ohira et al. | 55/299 |
| 3,909,220 | 9/1975 | Ylinen | 55/296 |
| 3,958,296 | 5/1976 | Fell | 55/294 X |

FOREIGN PATENT DOCUMENTS

| | | |
|---|---|---|
| 752342 | 2/1953 | Fed. Rep. of Germany |
| 1060698 | 7/1959 | Fed. Rep. of Germany |
| 1960470 | 6/1971 | Fed. Rep. of Germany |
| 1628635 | 8/1971 | Fed. Rep. of Germany |
| 984843 | 3/1965 | United Kingdom |
| 1436402 | 5/1976 | United Kingdom |

*Primary Examiner*—Kathleen J. Prunner
*Attorney, Agent, or Firm*—William P. Green

[57] ABSTRACT

A vacuum cleaner having a rotor which is mounted to turn at the inside of a filter bag of the device, and which acts when turned to contact the bag and displace accumulated dust from its outer surface. The rotor may be actuable from the outside of the cleaner when a cover of the cleaner is in closed active condition. The rotor desirably includes one or more resiliently flexible arms which are deflectable to a reduced diameter condition by the bag when the bag is constricted inwardly against and about the rotor by the flow of suction air when the device is in use.

28 Claims, 8 Drawing Figures

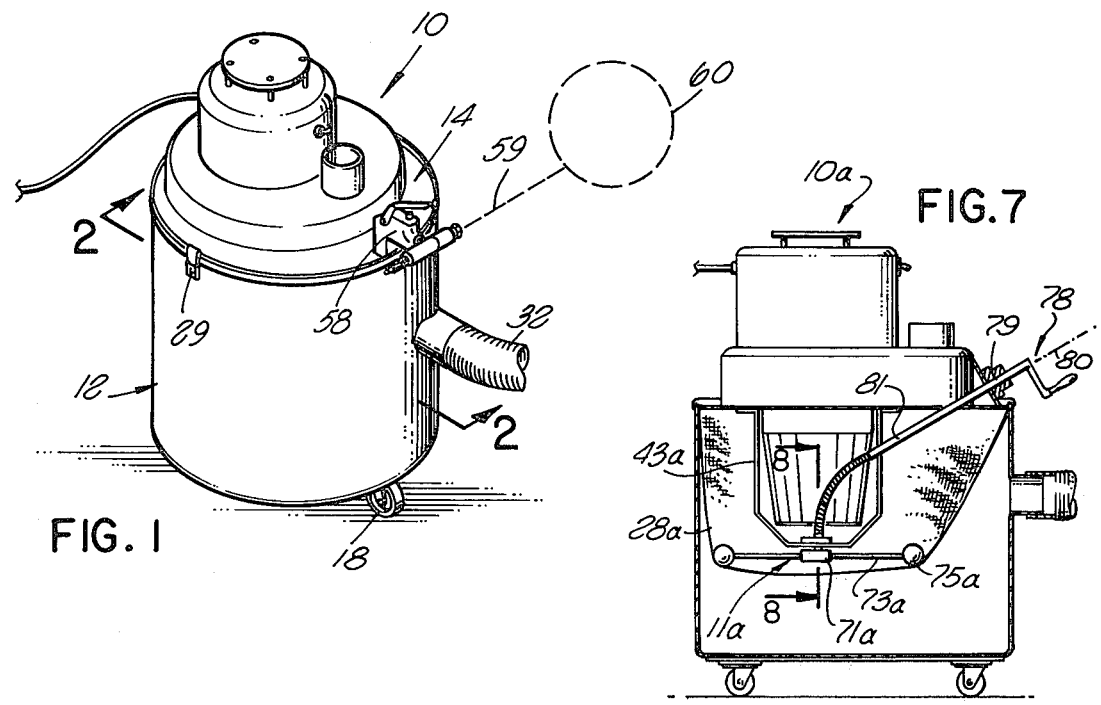
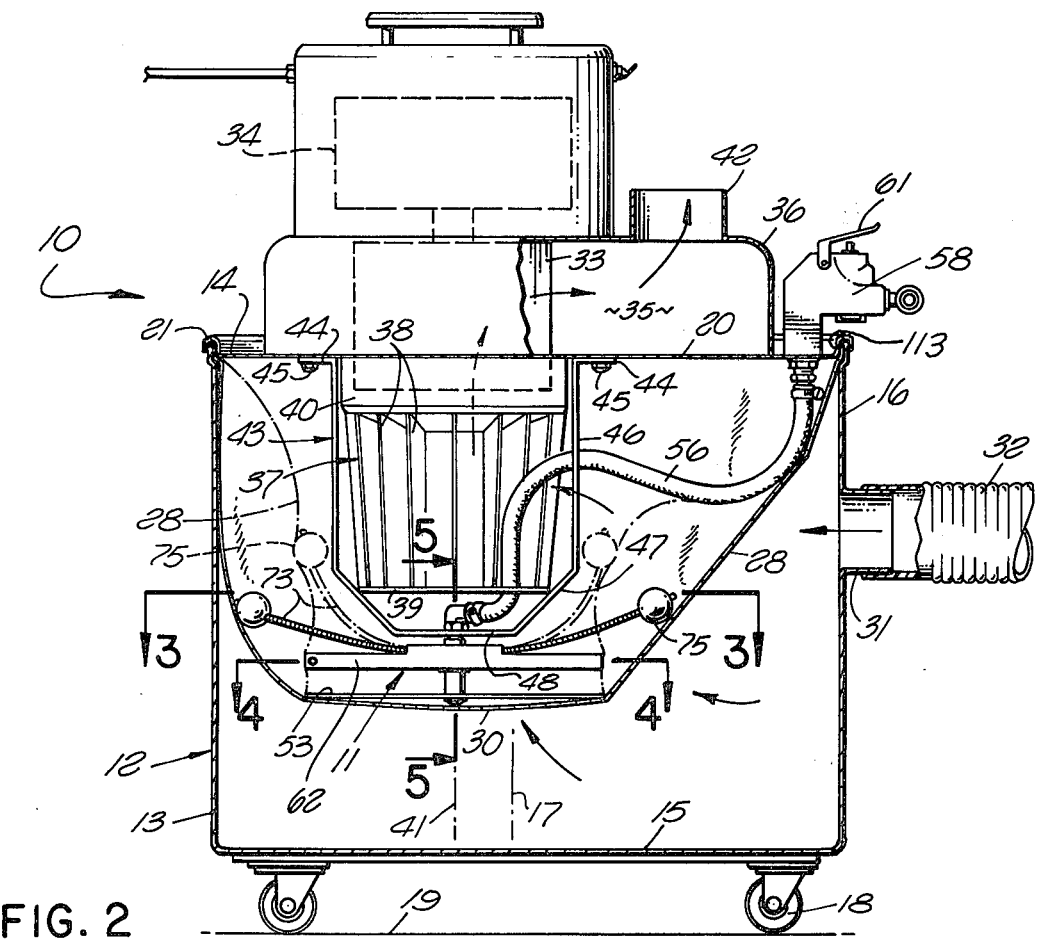

VACUUM CLEANER HAVING BAG CLEANING APPARATUS

This is a continuation of application Ser. No. 871,819, filed Jan. 24, 1978, now abandoned.

BACKGROUND OF THE INVENTION

This invention relates to improved vacuum cleaners having devices for cleaning accumulated dust from the surface of a filter bag in the cleaner.

After a conventional industrial or commercial vacuum cleaner of the type utilizing a filter bag has been in use for a period of time, dust filtered from the air stream tends to accumulate on the surface of the filter bag and restrict the flow of air through the bag. As a result, the suction produced by the cleaner is reduced, and its overall cleaning effectiveness is adversely affected. Various expedients have been proposed in the past for overcoming this effect, but none to my knowledge has enjoyed sufficient acceptance to warrant its use on a substantial scale in actual production cleaners.

One prior patent showing devices for this purpose in U.S. Pat. No. 3,236,032, which discloses arrangements having rotatable brushes or other rotors mounted within a cleaner bag and acting upon rotation to contact the inner surface of the bag and dislodge accumulated dust from its outer surface. However, these rotors of U.S. Pat. No. 3,236,032 are rendered accessible for actuation only when a top cover of the cleaner is removed. Such removal of the cover exposes a handle within the device by which the rotor may be manually turned to clean the bag, after which the cover and its carried parts must be reattached to the main lower portion of the vacuum cleaner. U.S. Pat. No. 3,621,641 shows arrangements in which a rotary part is connected to the bag eccentrically, and acts to move the bag upon rotation of the rotor in a manner displacing dust from its outer surface. U.S. Pat. No. 3,358,316 shows a cleaner in which a filter bag is mounted for what is termed a breathing movement in response to a change in vacuum conditions in the device, and this breathing movement is intended to clean dust from the bag surfaces. U.S. Pat. No. 3,276,066 shows a cleaner having a planar filter from which particles are removed by a rotary brush.

SUMMARY OF THE INVENTION

The present invention provides what is felt to be a more convenient and effective type of bag cleaning arrangement for a vacuum cleaner of the standard, commonly used industrial or commercial type. This cleaner has a casing preferably formed of a lower cylinder-like container having an upper open end across which a cover of the casing or device extends in the closed active condition of the unit. The cover is movable between closed position and an open position providing access to a filter bag which is suspended from the upper open end of the main container and extends downwardly into that container. The cover of the device carries a motor driven fan which acts to create a flow of air through the container or casing and inwardly through the wall of the porous filter bag, from its exterior to its interior, and then from the suction fan to atmosphere.

In an arrangement embodying the present invention, there is provided at the underside of the fan and within the bag a rotor which turns about a preferably vertical axis, and which contacts the interior of the bag wall to clean it as the rotor turns. Desirably, the rotor is actuable while the cover of the casing is closed, to thus avoid the necessity for opening the cover each time that the bag is to be cleaned. In one form of the invention, a motor is provided in the device, preferably a motor energized by compressed air, while in another form of the invention the rotor within the cleaner can be manually operated by a manually actuated crank or other element accessible from the outside of the closed container and appropriately connected to the rotor in driving relation. Maximum convenience in handling is attained by connecting the rotor to the cover, so that when the cover is moved to its open position the bag cleaning rotor is also moved out of the bag to allow access to the bag for removal if desired.

When the vacuum cleaner is in operation, the flow of air through the device tends to constrict or draw the bag radially inwardly to a condition of reduced horizontal cross section, and about a downwardly projecting air intake portion of the fan assembly. A further feature of the invention resides in the formation of the bag cleaning rotor to respond to this inward constricting force exerted by the bag as a result of the flow of air through the device, and reduce the effective size of the rotor itself to avoid interference by the rotor with such constricting movement of the bag. More particularly, the rotor desirably has one or more arms projecting outwardly from the axis about which the rotor turns, and those arms are constructed to be longitudinally flexible, so that the inward constricting force exerted by the bag will bend the flexible arm or arms to a reduced effective diameter condition relative to the axis of rotation of the rotor, and thus permit the inward constriction of the bag essentially as though the rotor were not present. These arms are desirably resilient, to normally return by their own resilience to their outwardly projecting normal cleaning conditions when the constricting force on the bag is relieved. For best results, the arms are formed as coil springs, having enlargements at their outer ends for contacting the bag surface.

BRIEF DESCRIPTION OF THE DRAWINGS

The above and other features and objects of the invention will be better understood from the following detailed description of the typical embodiments illustrated in the accompanying drawings, in which:

FIG. 1 is a perspective view of a vacuum cleaner constructed in accordance with the invention;

FIG. 2 is an enlarged vertical section through the cleaner, and taken on line 2—2 of FIG. 1;

FIG. 7 is a reduced scale, somewhat diagrammatic view similar to FIG. 2, but showing a variational form of the invention.

DESCRIPTION OF THE PREFERRED EMBODIMENTS

Figure 3:
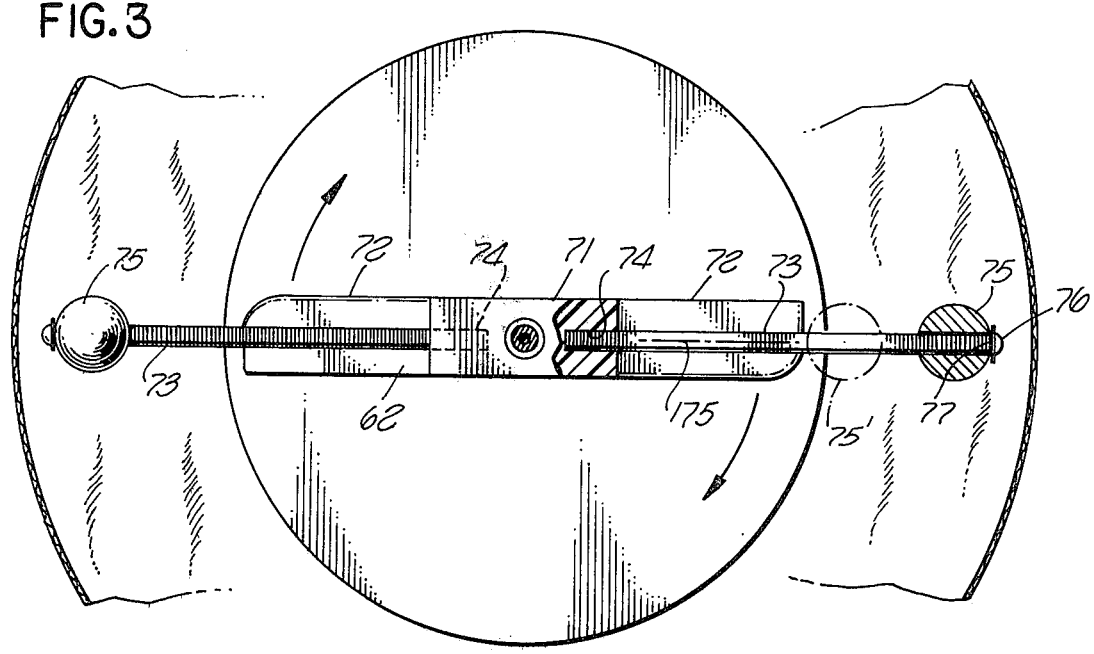
FIGS. 3 and 4 are further enlarged horizontal fragmentary sections taken on lines 3—3 and 4—4 respectively of FIG. 2.
Figure 4:
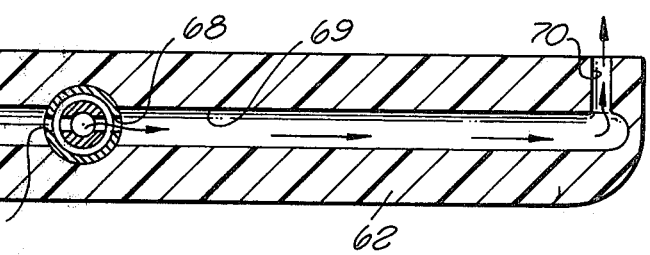

The vacuum cleaner 10 illustrated in FIGS. 1 and 2 is of a known, completely conventional structure except with regard to the provision of a bag cleaning rotor 11 and various parts associated with that rotor. The conventional portion of the cleaner includes a hollow casing 12 formed of a lower cylindrical container 13 and an upper cover 14. Container 13 may have a horizontal bottom wall 15 and a vertically extending cylindrical side wall 16 centered about a vertical axis 17. Casters 18 mounted to the underside of container 13 support the device to roll along a floor or other supporting surface 19.

Figure 6:
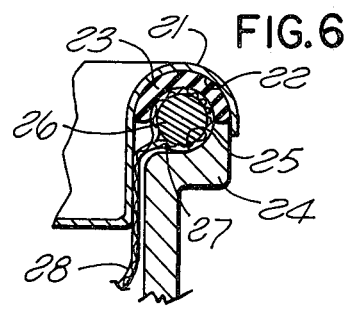
FIG. 6 is an enlarged fragmentary vertical section through the connection which is formed between the periphery of the top cover and the lower container or main casing element.

The cover 14 has a flat horizontal wall 20 extending across the upper open end or top opening 113 of container 13 and deformed at its periphery to form a circular bead 21 (FIG. 6) containing an annular downwardly facing groove 22 within which a circular seal element 23 of rubber or other appropriately deformable sealing material is retained. This seal element 23 may have the semi-circular vertical sectional configuration illustrated in FIG. 6, and may be secured by adhesive or otherwise within groove 22. The upper edge of sidewall 16 of container 13 is deformed as shown in FIG. 6 to provide an outwardly extending flange 24, having an upper surface 25 which is annular about axis 17 and in vertical section has the curving configuration illustrated in FIG. 6 complementary to the curved seal element 23. Between these parts, there is confined a ring 26 about which the edge portion 27 of a filter bag 28 is received, so that when the cover 14 is tightened downwardly by two or more releasable clips 29 (FIG. 1), the ring 26 and surrounding edge portion of the bag 28 are tightly gripped between the cover and the upper edge of the container to form a seal between these parts.

The filter bag 28 is of conventional construction, and as seen in FIG. 2 extends downwardly and inwardly to a lower, essentially horizontal portion 30 of the bag. An air inlet 31 connected to a suction hose 32 conducts air and entrained dust particles into the interior of container 13 and about the outside of bag 28. The bag is of a porous cloth or other material acting to pass air through the bag to its interior, while preventing the flow of the dust particles through the bag and thus causing them to accumulate in container 13.

This flow of air is created by a fan which is diagrammatically represented at 33 in FIG. 2, and which is driven by a motor diagrammatically represented at 34. The fan and motor are connected to cover 14 of the device, with the fan acting to draw air upwardly from the interior of bag 28 and discharge it into a chamber 35 formed within a plenum member 36 projecting upwardly at the upper side of wall 20 of the cover. Extending downwardly from its horizontal wall 20, the cover carries an air intake structure 37, which is of conventional construction, and which may have a series of circularly spaced vertical wall elements 38 extending vertically from a bottom horizontal wall 39 to an upper structure 40 secured to the top cover. As will be understood, air flows radially inwardly toward a vertical axis 41 of the air intake structure 37 and motor and fan, the air flowing between the wall elements 38, and then flowing upwardly to fan or blower 33 by which the air is discharged laterally into plenum chamber 35 for ultimate discharge to the atmosphere through an outlet tube 42. The wall elements 38 function to limit the extent to which the flexible filter bag 28 can constrict inwardly under the influence of suction when the device is in use.

Figure 5:
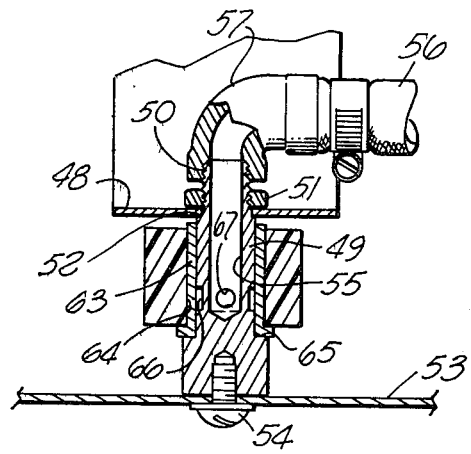
FIG. 5 is an enlarged fragmentary vertical section taken on line 5—5 of FIG. 2.

To now describe the structure of the rotor 11 and related parts with which the present invention is particularly concerned, it is noted that these parts may be mounted to the underside of cover 14, as by provision of a mounting bracket 43 having opposite ends turned horizontally at 44 and secured by screws 45 to horizontal wall 20 of the cover. The bracket 43 may be formed of an elongated strip of material, which extends downwardly at 46 from each of the upper turned portions 44, and then extends inwardly at 47 and horizontally at 48 beneath air inlet structure 37 of the fan. The rotor 11 is mounted rotatively to this bracket 43, to turn about the previously mentioned axis 41. Such mounting may be effected in the manner illustrated in FIG. 5, in which a central vertical shaft member 49 is attached to the lower horizontal portion 48 of mounting bracket strip 43 by extension of a threaded portion 50 of shaft 49 upwardly through an opening in bracket portion 48, and by connection of a nut 51 onto the upper threaded portion of shaft 49 to clamp portion 48 of the bracket between the nut 51 and a shoulder 52 formed on shaft 49. A horizontal circular preferably rigid disc 53 of metal or other suitable material is connected to the lower end of stationary shaft 49, as by a screw 54 extending upwardly through the disc 53 and connecting into shaft 49 (FIG. 5). This circular disc 53 is centered about the vertical axis 41.

Compressed air is supplied to a vertical passage 55 formed in shaft 49 through a flexible hose 56 connected to the shaft by a threaded elbow 57. Hose 56 is connected at its other end to a valve fitting 58 (FIG. 2), into which compressed air is admitted from a flexible supply hose represented at 59 in FIG. 1, which in turn is connected to and receives air from an appropriate source 60 of compressed air. Valve unit 58 contains a valve which is actuable by a manually operated control element 61, to admit compressed air to the rotor assembly 11 when element 61 is depressed, and to close off such flow of air when the element 61 is released.

The rotor 11 includes an elongated member 62 which may be formed of an appropriate, preferably rigid, resinous plastic material or other substance, and which extends diametrically with respect to axis 41. This member 62 is mounted rotatively about shaft 49, as by providing a tubular bushing element 63 (FIG. 5) secured within a central vertical opening 64 in part 62, with that bushing element being a close fit about the outer cylindrical surface of shaft 49, and being supported on a horizontal shoulder 65 on the shaft. A groove 66 formed in the outer surface of the shaft 49 is in communication with the interior of the shaft through openings 67, and is in communication also with openings 68 formed in bushing 63. These openings 68 in turn lead compressed air into two passages 69 leading in diametrically opposite directions with respect to axis 41 and outwardly through the oppositely directed portions of member 62 to its opposite ends, at which the air flows through a pair of short passages 70 aimed essentially tangentially with respect to axis 41 to function as an air motor causing rotation of member 62 about axis 41 as a result of the emission of the air jets from those nozzle passages 70. The member 62 is, of course, desirably symmetrical and balanced with respect to axis 41.

The radially inner portion 71 of member 62, near axis 41, is thicker vertically than are the outer portions 71 of the two arms formed by member 62 (FIGS. 2 and 3), so that a pair of resiliently flexible bag cleaning arms 73 may be connected into portion 71 and project radially outwardly therefrom. As seen in FIG. 3, portion 71 of part 62 has two bores 74 formed therein, and facing in diametrically opposite directions, with the two bores being centered about a common horizontal axis 175 perpendicular to and intersecting axis 41. Connected into these two bores 74 are the two arms 73, which preferably take the form of two coil springs normally tending by their own resilience to assume a straight line aligned condition of extension along axis 175. These springs may be of identical construction, and carry enlargements 75 at their outer ends, which may be formed as externally spherical balls having bores within which the springs 73 are received. Headed pins, screws, or other fasteners 76 are rigidly secured to the outer ends of springs 73, and retain washers 77, or otherwise form shoulders, which limit the radially outward movement of enlargements 75 at the positions illustrated in FIG. 3. These balls 75 may be movable radially inwardly along the springs 73, as to the broken line position represented at 75' in FIG. 3, or may alternatively be rigidly secured in their outermost positions on the spring arms. The inner ends of the springs 73 are secured in fixed positions within the bores 74 in any appropriate manner, as by cementing, or by press fitting them within the bores, or otherwise.

To now describe the use of the device of FIGS. 1–6, when it is to be employed as a vacuum cleaner, the motor 34 is energized to drive fan or blower 33 rotatively about axis 41, and create the previously discussed flow of air inwardly through hose 32 to the interior of container 13, and then inwardly through the side wall of bag 28 to its interior, and ultimately through structure 37 to the fan and then from the fan through plenum chamber 35 and tube 42 to the atmosphere. This flow of air causes the wall of bag 28 to be drawn inwardly by suction toward fan inlet structure 37. In the absence of the present bag cleaning apparatus, the bag 28 might be drawn directly against elements 38 of that structure 37. When the cleaning apparatus is provided, the lower disc 53 tends to limit the constriction of the bag. As the bag constricts inwardly above the level of bottom disc 53, as to the broken line condition represented in FIG. 2, the inward constriction of the bag acts to bend coil spring arms 73 upwardly and inwardly to their broken line positions of FIG. 2, in which they have a reduced effective diameter with respect to axis 41. The arms 73 and carried enlargements 75 thus do not interfere appreciably with the operation of the bag or other related equipment.

If accumulated dust on the outer surface of bag 28 tends to abnormally restrict the flow of air through the bag, the motor 34 is turned off, and valve actuating element 61 is depressed to admit compressed air from source 60 to rotor 11, to cause its rotation about axis 41. As the rotor turns, the radially outwardly projecting flexible resilient arms 73 move their carried enlargement 75 along the inner surface of the bag, and by contact with the bag move the wall of the bag sufficiently to displace dust from its outer surface. A very short period of rotation of rotor 11, say for example, for a period of 10 seconds, will be sufficient to effectively clean the bag, following which the valve is closed and the rotation of the rotor is stopped, so that the cleaner can again be used in a vacuum cleaning operation. During the bag cleaning step, the two flexible arms 73 may be bent slightly upwardly by engagement with bag wall 28, as seen in FIG. 2, to thereby exert some yielding force against the bag maximizing the cleaning effect, or in other instances the arms 73 may extend directly radially outwardly in the positions to which their resilience tends to normally return them. When it becomes necessary to remove the accumulated dust from container 13, the clips 29 are released and cover 14 is removed upwardly from container 13, with the entire rotor assembly and its valve moving with the cover and thus leaving the bag fully accessible for removal to permit dumping of dust from container 13.

Figure 8:
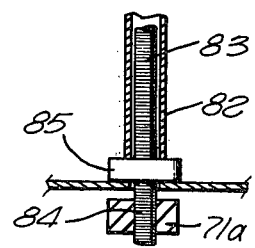
FIG. 8 is a section taken on line 8—8 of FIG. 7 and showing the flexible drive shaft of the device.

The variational form of vacuum cleaner 10a illustrated in FIGS. 7 and 8 is identical with that shown in FIGS. 1–6 except that the bag cleaning rotor 11a, for cleaning bag 28a, is manually actuable from the outside of the cleaner rather than being air operated. Rotor 11a may include a central part 71a carrying two diametrically oppositely projecting spring arms 73a identical with arms 73 of FIGS. 1–6 and carrying similar enlargements 75a for contacting and cleaning the bag. The rotor 11a is driven by a manually actuated element such as a crank member 78 accessible from the outside of the cleaner when the cover is in place. This crank 78 may be mounted to the cover by an appropriate bearing structure 79 to turn about an axis 80, and may be connected to rotor 11a by a flexible drive shaft assembly 81. As seen in FIG. 8, this flexible drive shaft may include a tubular outer coil spring type housing or armor member 82 through which a flexible shaft 83 extends, for rigid connection in any appropriate manner to member 71a at 84. A suitable bearing represented diagramatically at 85 locates the shaft 83 for rotation about a vertical axis relative to the bracket member 43a.

As will be understood, when it becomes necessary to clean the bag in the FIGS. 7 and 8 arrangement, the motor is turned off, and the user turns hand crank 78 to manually rotate rotor 11a and cause it to clean the bag in a manner similar to that discussed with the first form of the invention.

While certain specific embodiments of the present invention have been disclosed as typical, the invention is of course not limited to these particular forms, but rather is applicable broadly to all such variations as fall within the scope of the appended claims.

I claim:
1. A vacuum cleaner comprising:
a casing having an air inlet and an air outlet;
a flexible filter bag in said casing;
a motor driven fan for producing a flow of suction air through said casing between said inlet and outlet and through the material of said bag from the exterior of the bag to its interior to collect dust at the outside of the bag;
a bag cleaning rotor mounted within said bag to turn about an axis and against which the bag is constricted inwardly by said flow of suction air when the fan is in operation; and
means for turning said rotor about said axis;
said rotor having at least one arm which projects outwardly away from said axis in an extended position of the arm when the rotor is turned while the fan is not in operation, and which has a radially outer portion acting in said extended position of the arm to contact the inside of the bag as the rotor turns and displace dust from the exterior thereof;
said arm being constructed to flex longitudinally in a relation swinging said outer portion thereof from said extended position inwardly toward said axis to a position substantially reducing the effective diameter of the rotor, under the influence of force exerted inwardly by the bag when constricted by said flow of suction air;

said arm including a coil spring and said outer portion thereof including a bag contacting element received about and movable axially along said coil spring.

2. A vacuum cleaner comprising:

a casing having an air inlet and an air outlet;

a flexible filter bag in said casing;

a motor driven fan for producing a flow of suction air through said casing between said inlet and outlet and through the material of said bag from the exterior of the bag to its interior to collect dust at the outside of the bag;

a bag cleaning rotor mounted within said bag to turn about an essentially vertical axis and against which the bag is constricted inwardly by said flow of suction air when the fan is in operation;

means for turning said rotor about said axis;

said rotor having at least one arm which projects outwardly away from said axis in an extended position of the arm when the rotor is turned while the fan is not in operation, and which has a radially outer portion acting in said extended position of the arm to contact the inside of the bag as the rotor turns and displace dust from the exterior thereof;

said arm being constructed to flex longitudinally in a relation swinging said outer portion thereof from said extended position inwardly toward said axis to a position substantially reducing the effective diameter of the rotor, under the influence of force exerted inwardly by the bag when constricted by said flow of suction air; and a member within the bag at a location beneath said rotor and acting to limit constriction of the lower portion of the bag.

3. A vacuum cleaner as recited in claim 2, in which said flexible arm includes an elongated coil spring whose longitudinal axis, in said extended position of the arm, extends outwardly away from said first mentioned axis, and which is deflectible inwardly by the bag but normally tends to return by its own resilience to said extended position.

4. A vacuum cleaner as recited in claim 2, in which said outer portion of the arm is adapted to be flexed upwardly and inwardly from said extended position thereof.

5. A vacuum cleaner as recited in claim 2, in which said longitudinally flexible arm is resiliently deformable and tends by its own resilience to normally return to said extended position.

6. A vacuum cleaner as recited in claim 2, in which said arm is longitudinally flexible through more than one-half of the radial distance from said axis to the radially outer extremity of the arm.

7. A vacuum cleaner as recited in claim 2, in which said rotor has a second longitudinally flexible bag cleaning arm projecting in a direction different than said first mentioned arm relative to said axis and in circularly spaced relation thereto, both of said arms being adapted to flex upwardly and inwardly from their extended positions.

8. A vacuum cleaner as recited in claim 2, in which said rotor has a second flexible arm projecting in a direction different than said first mentioned arm and away from said essentially vertical axis and each arm including a coil spring normally retained by its own resilience in a radially outwardly projecting extended position but deflectable inwardly by said bag, said springs being free to flex upwardly and inwardly.

9. A vacuum cleaner as recited in claim 2, in which said outer portion of the arm includes an enlargement at the radially outer end of the arm for engaging and cleaning the bag.

10. A vacuum cleaner as recited in claim 2, in which said means for turning the rotor includes power energized motor means operable to drive the rotor.

11. A vacuum cleaner as recited in claim 2, in which said means for turning the rotor includes motor means energized by compressed air to drive the rotor.

12. A vacuum cleaner as recited in claim 2, in which said means for turning the rotor includes means connected to said rotor to turn therewith and acting to emit compressed air generally tangentially to drive the rotor.

13. A vacuum cleaner as recited in claim 2, in which said means for turning the rotor includes a drive mechanism manually actuable from the outside of the casing to turn the rotor.

14. A vacuum cleaner comprising:

a casing having an air inlet and an air outlet;

a flexible filter bag in said casing;

a motor driven fan for producing a flow of suction air through said casing between said inlet and outlet and through the material of said bag from the exterior of the bag to its interior to collect dust at the outside of the bag;

a bag cleaning rotor mounted within said bag to turn about an essentially vertical axis and against which the bag is constricted inwardly by said flow of suction air when the fan is in operation;

means for turning said rotor about said axis;

said rotor having at least one arm which projects outwardly away from said axis in an extended position of the arm when the rotor is turned while the fan is not in operation, and which has a radially outer portion acting in said extended position of the arm to contact the inside of the bag as the rotor turns and displace dust from the exterior thereof;

said arm being constructed to flex longitudinally in a relation swinging said outer portion thereof from said extended position inwardly toward said axis to a position substantially reducing the effective diameter of the rotor, under the influence of force exerted inwardly by the bag when constricted by said flow of suction air; and a generally horizontal non-rotating disc within the bag at a location spaced beneath said rotor and extending essentially about said axis and acting to limit constriction of the lower portion of the bag.

15. A vacuum cleaner comprising:

a casing having an air inlet and an air outlet;

a flexible filter bag in said casing;

a motor driven fan for producing a flow of suction air through said casing between said inlet and outlet and through the material of said bag from the exterior of the bag to its interior to collect dust at the outside of the bag;

a bag cleaning rotor mounted within said bag to turn about an essentially vertical axis and against which the bag is constricted inwardly by said flow of suction air when the fan is in operation;

means for turning said rotor about said axis;

said rotor having at least one arm which projects outwardly away from said axis in an extended position of the arm when the rotor is turned while the fan is not in operation, and which has a radially outer portion acting in said extended position of the arm to contact the inside of the bag as the rotor turns and displace dust from the exterior thereof;

said arm being constructed to flex longitudinally in a relation swinging said outer portion thereof from said extended position inwardly toward said axis to a position substantially reducing the effective diameter of the rotor, under the influence of force exerted inwardly by the bag when constricted by said flow of suction air; and a member within the bag at a location beneath said rotor and acting to limit constriction of the lower portion of the bag;

said arm having a longitudinally flexible portion directly above a portion of said member.

16. A vacuum cleaner comprising:

a casing having an air inlet and an air outlet;

a flexible filter bag in said casing;

a motor driven fan for producing a flow of suction air through said casing between said inlet and outlet and through the material of said bag from the exterior of the bag to its interior to collect dust at the outside of the bag;

a bag cleaning rotor mounted within said bag to turn about an axis and against which the bag is constricted inwardly by said flow of suction air when the fan is in operation;

means for turning said rotor about said axis;

said rotor having at least one arm which projects outwardly away from said axis in an extended position of the arm when the rotor is turned while the fan is not in operation, and which has a radially outer portion acting in said extended position of the arm to contact the inside of the bag as the rotor turns and displace dust from the exterior thereof;

said arm being constructed to flex longitudinally in a relation swinging said outer portion thereof from said extended position inwardly toward said axis to a position substantially reducing the effective diameter of the rotor, under the influence of force exerted inwardly by the bag when constricted by said flow of suction air;

a shaft connected at an upper end to the casing and projecting downwardly and about which said rotor turns;

said means for turning the rotor including means rotating therewith about the shaft and passaged to emit compressed air generally tangentially to drive the rotor;

said shaft containing a passage conducting compressed air to said last mentioned means; and a member attached to said shaft at a location beneath the rotor and extending about said axis and acting to limit constriction of the bag.

17. A vacuum cleaner comprising:

a casing having an air inlet and an air outlet and including a dust collecting container having a top opening and a cover extending across said top opening and movable between a closed position and an open position;

a flexible filter bag supported by said container within said top opening and extending downwardly into the container;

a motor driven fan carried by said cover and acting to produce a flow of suction air into said container and through the material of said bag from its exterior to its interior to collect dust at the outside of the bag, with the cleaned air then being discharged by the fan;

a bag cleaning rotor mounted rotatably to the cover and received within the bag and operable to turn about a generally vertical axis and acting, when so turned, to engage the inside of the bag in a relation displacing dust from its exterior;

means for driving said rotor about said generally vertical axis when the cover is closed;

said rotor having at least one arm projecting outwardly away from said axis in an extended position of the arm when the rotor is turned while the fan is not in operation, and which has a radially outer portion acting in said extended position of the arm to contact the inside of the bag as the rotor turns and displace dust from the exterior thereof;

said arm being resilient and tending by its resilience to return to said extended position and being constructed to flex longitudinally in a relation swinging said outer portion thereof inwardly toward said axis to a position substantially reducing the effective diameter of the rotor under the influence of force exerted inwardly by the bag when constricted by said flow of suction air;

said arm being free for flexure upwardly from said extended position; and a member carried by said cover and extending generally horizontally at a location beneath said rotor and about said axis and acting to limit constriction of the bag.

18. A vacuum cleaner as recited in claim 17, in which said rotor has a second resilient arm, each of said arms including an elongated coil spring projecting generally radially outwardly relative to said axis and which normally tends to return by its own resilience to said extended position.

19. A vacuum cleaner comprising:

a casing having an air inlet and an air outlet and including a dust collecting container having a top opening and a cover extending across said top opening and movable between a closed position and an open position;

a flexible filter bag supported by said container within said top opening and extending downwardly into the container;

a motor driven fan carried by said cover and acting to produce a flow of suction air into said container and through the material of said bag from its exterior to its interior to collect dust at the outside of the bag, with the cleaned air then being discharged by the fan;

a bag cleaning rotor mounted rotatably to the cover and received within the bag and operable to turn about a generally vertical axis and acting, when so turned, to engage the inside of the bag in a relation displacing dust from its exterior;

means for driving said rotor about said generally vertical axis when the cover is closed and including motor means connected to the rotor to turn therewith and passaged to emit compressed air generally tangentially to drive the rotor;

said rotor having at least one arm projecting outwardly away from said axis in an extended position of the arm when the rotor is turned while the fan is not in operation, and which has a radially outer portion acting in said extended position of the arm to contact the inside of the bag as the rotor turns and displace dust from the exterior thereof;

said arm being resilient and tending by its resilience to return to said extended position and being constructed to flex longitudinally in a relation swinging said outer portion thereof inwardly toward said axis to a position substantially reducing the effective diameter of the rotor under the influence of force exerted inwardly by the bag when constricted by said flow of suction air;

said arm being free to flex vertically from said extended position; and a member carried by said cover and extending generally horizontally at a location within said bag and beneath said rotor and about said axis and acting to limit constriction of the bag.

20. For use in a vacuum cleaner having a casing containing a flexible filter bag through which air is drawn from the exterior to the interior of the bag by a motor driven fan mounted to the casing, the combination comprising:

a bag cleaning rotor;

means for mounting said rotor to turn about a predetermined axis at a location within said bag and in a position in which the bag will be constricted inwardly against said rotor by the flow of suction air from the exterior of the bag to its interior when the fan is in operation;

means for turning the rotor about said axis and within the bag;

said rotor having at least one arm which projects outwardly away from said axis in an extended position of the arm when the rotor is turned while the fan is not in operation, and which has a radially outer portion acting in said extended position of the arm to contact the inside of the bag as the rotor turns and displace dust from the exterior thereof;

said arm being constructed to flex longitudinally in a relation swinging said outer portion thereof from said extended position inwardly toward said axis to a position substantially reducing the effective diameter of the rotor under the influence of force exerted inwardly by the bag when constricted by said flow of suction air; and a member to be received beneath said rotor and within said bag at a location to limit constriction of the bag.

21. The combination as recited in claim 20, in which said flexible arm includes an elongated coil spring whose longitudinal axis, in said extended position of the arm, extends outwardly away from said first mentioned axis, and which is deflectible inwardly by the bag but normally tends to return by its own resilience to said extended position.

22. The combination as recited in claim 20, in which said arm is resilient and normally tends to return by its own resilience to said extended position.

23. The combination as recited in claim 20, in which said means for turning the rotor includes a structure turning with the rotor and operable to emit compressed air generally tangentially to drive the rotor.

24. The combination as recited in claim 23, including valve means for controlling the admission of compressed air to said structure to start and stop rotation thereof.

25. The combination as recited in claim 20, in which said arm is longitudinally flexible through more than one-half of the radial distance from said axis to the radially outer extremity of the arm.

26. The combination as recited in claim 20, in which said axis about which the rotor turns is to extend generally vertically in use, and said arm is free to flex upwardly in use.

27. For use in a vacuum cleaner having a casing containing a flexible filter bag through which air is drawn from the exterior to the interior of the bag by a motor driven fan mounted to the casing, the combination comprising:

a mounting structure to be received within said casing and connected thereto;

a bag cleaning rotor carried rotatably by said mounting structure and adapted to be received within said bag and turn about a generally vertical axis therein with the bag being constrictable inwardly against the rotor by the flow of suction air from the exterior of the bag to its interior when the fan is in operation;

means connected to said rotor for rotation therewith and passaged to emit compressed air generally tangentially to drive the rotor;

a shaft connected to said mounting structure and projecting downwardly therefrom and about which the rotor turns and containing a passage communicating with said means, to deliver air thereto;

means for delivering air to said passage in said shaft;

said rotor having at least one arm which projects outwardly away from said axis in an extended position of the arm when the rotor is turned while the fan is not in operation, and which has a radially outer portion acting in said extended position of the arm to contact the inside of the bag as the rotor turns and displace dust from the exterior thereof;

said arm being resilient and tending by its resilience to return to said extended position and being constructed to flex longitudinally in a relation swinging said outer portion thereof against its resilience from said extended position inwardly toward said axis to a position substantially reducing the effective diameter of the rotor under the influence of force exerted by the bag when constricted by said flow of suction air; and a member within the bag connected non-rotatably to said shaft at a location beneath the rotor and acting to limit constriction of the bag.

28. The combination as recited in claim 27, in which said rotor has a second arm projecting in a direction generally the opposite of said first mentioned arm, each of said arms including an elongated coil spring, said member being a circular disc spaced beneath said rotor, there being an air supply line adapted to extend from the outside of the casing to said shaft, and valve means to be received at the outside of the casing for controlling delivery of compressed air through said line to the shaft.

* * * * *